Sept. 18, 1923.
I. JULIAN
CHICK FEEDER
Filed March 31, 1923    2 Sheets-Sheet 1
1,468,205
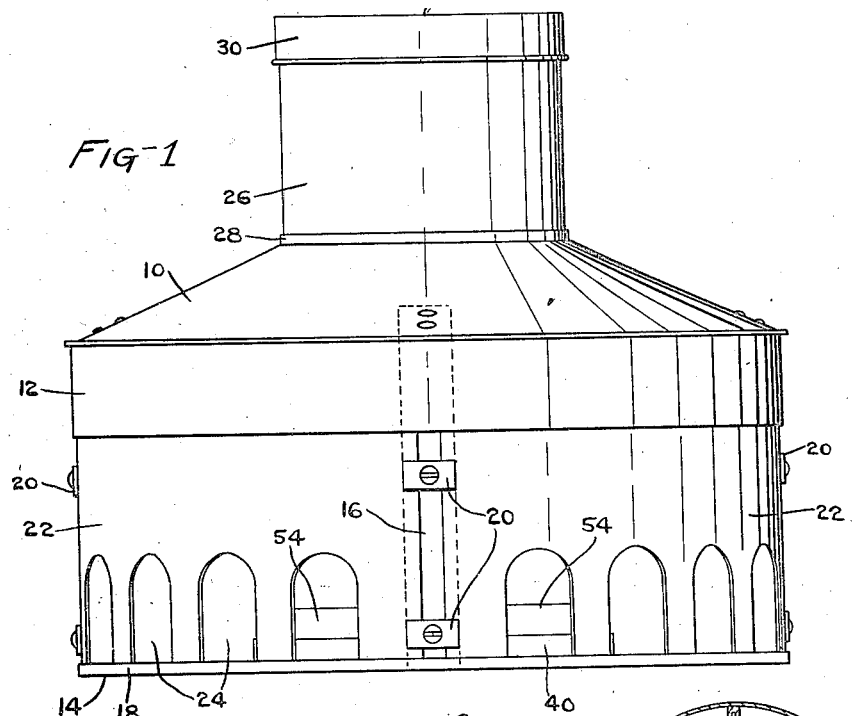
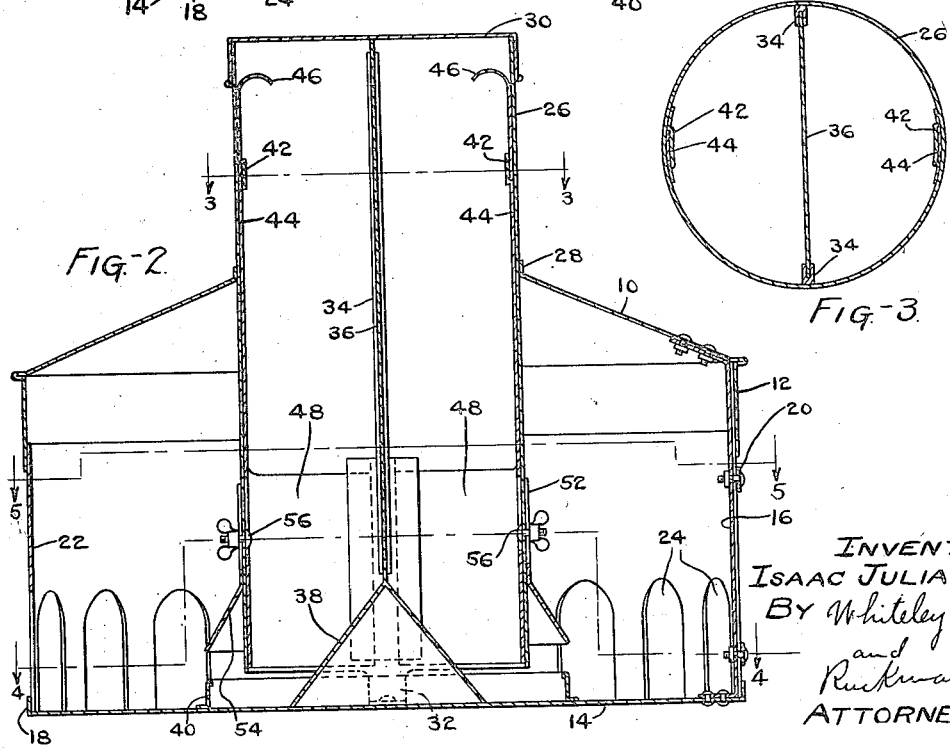
INVENTOR
ISAAC JULIAN.
By Whiteley
and
Ruckman
ATTORNEYS.

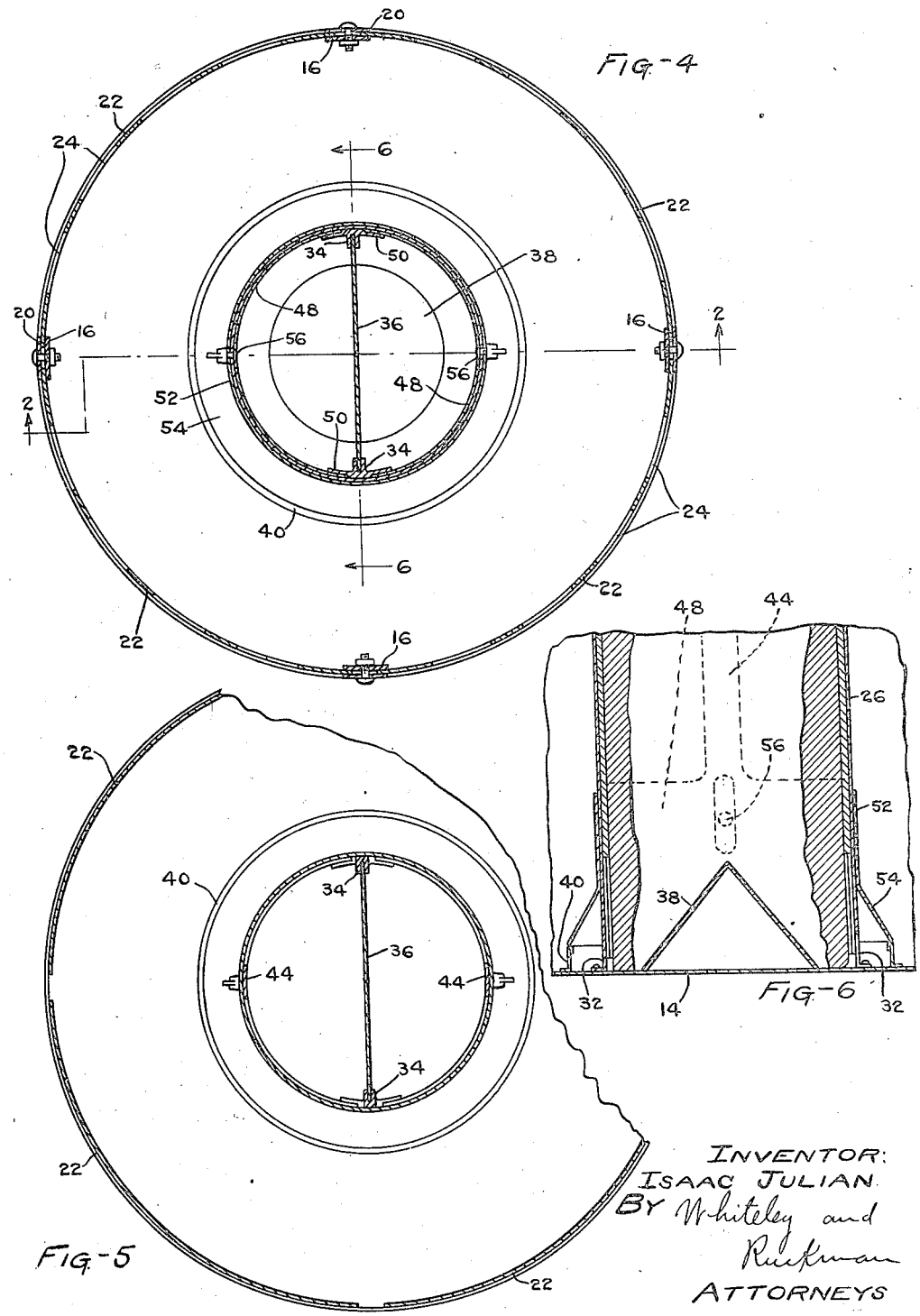

Patented Sept. 18, 1923.                                        1,468,205

UNITED STATES PATENT OFFICE.

ISAAC JULIAN, OF CHATFIELD, MINNESOTA.

CHICK FEEDER.

Application filed March 31, 1923. Serial No. 629,050.

*To all whom it may concern:*

Be it known that I, ISAAC JULIAN, a citizen of the United States, residing at Chatfield, in the county of Fillmore and State of Minnesota, have invented certain new and useful Improvements in Chick Feeders, of which the following is a specification.

My invention relates to chick feeders, and an object is to provide a device of this character which will automatically deliver the feed to the chicks as the feed is consumed and which will prevent wasting and soiling of the latter. Another object is to provide a feeder which will prevent entrance of rain so that the danger of the chicks eating sour feed is prevented. Another object is to provide a feeder which is adapted to contain a plurality of kinds of feed and deliver the same to the chicks without mixing the different feeds. Another object is to provide a feeder having means for regulating the rate of delivery of the feed and which means can be regulated according to the character of the feed. Another object is to provide a feeder having a protector which prevents the chicks getting their feet in the feed and which can be shut down when desired to prevent birds and vermin reaching the feed at times when the chicks are not feeding. Another object is to provide a feeder which will retain the feed in sanitary condition, and which can be readily cleaned. This application discloses an improvement of my prior application S. N. 539,201 filed Feb. 25, 1922.

The full objects and advantages of my invention will appear in connection with the detailed description, and the novel features of my inventive idea will be particularly pointed out in the claims.

Referring to the accompanying drawings which illustrate one embodiment of my invention,—Fig. 1 is an end elevational view of a chick feeder. Fig. 2 is a view in central vertical section. Fig. 3 is a view in horizontal section on the line 3—3 of Fig. 2. Fig. 4 is a view in horizontal section on the line 4—4 of Fig. 2. Fig. 5 is a view in horizontal section on the line 5—5 of Fig. 2. Fig. 6 is a fragmentary view in vertical section on the line 6—6 of Fig. 4 and showing a protector in closed position.

As shown in the drawings, I provide a housing to which is attached a roof 10 having a depending annular flange 12, this roof being supported above a bottom member 14 by a number of vertical posts or supports 16. The bottom member is provided with an upturned rim 18 and the vertical supports or posts 16 are provided with fasteners 20. Detachable housing members 22 are secured in place by the fasteners 20 which hold these members against the posts 16 with the lower edges of the members 22 inside the rim 18 and the upper edges inside the flange 12. The casing members are provided with a multiplicity of openings 24 through which the chicks may enter the housing. A feed retaining hopper 26 extends centrally through the roof 10 being preferably soldered thereto at 28 in order to make a watertight joint. The upper end of this hopper is provided with a cover 30 and the lower end of the hopper stops short of the bottom member 14 but is rigidly attached thereto by two diametrically opposite ears 32. Secured to the inner surface of the hopper at diametrically opposite places are vertically disposed channel guides 34 in which a partition 36 is slidably received. Carried by the lower end of this partition is a conical member 38 which directs the feed outwardly beneath the lower edge of the hopper and into an annular trough formed by an upstanding flange 40 secured to the bottom 14 and located outside of and concentric with the lower end of the hopper. Secured to the inside of the hopper at places between the channel guides 34 are strap guides 42 which slidably receive strips 44 which at their upper ends are curved inwardly to provide finger engageable portions 46. Attached to the lower ends of the strips 44 are shutoff slides 48 which are substantially semicircular as shown in Fig. 4 and which are guided by flanges 50 extending out from the channel guides 34. Slidably mounted upon the outside of the hopper at its lower end is a protector which consists of a ring 52, the lower portion of which is flared out to form a conical member 54, the lower edge of which has a diameter the same as that of the trough flange 40. In order to hold the protector in place at the desired height, bolts 56 pass through holes in the hopper and through slots in the ring 52 and through slots in the slides 48.

The operation and advantages of my invention will now be understood. The provision of the partition 36 divides the hopper into two compartments which are adapted to contain different kinds of feed such as mash and grain. The feed supplied to the hopper at its upper end will be continuously discharged by gravity under the lower end of the hopper into the annular trough which is limited by the flange 40 as fast as the feed is consumed by the chicks. The amount of feed thus discharged may be regulated by the slides 48 and if desired the discharge may be entirely cut off. When the chicks are feeding, the protector 54 will be held in the position shown in Fig. 2 so that there will be space enough between the protector and the flange 40 for the heads of the chicks. At the same time, the protector prevents the chicks getting their feet into the trough. At any time desired, as at night, the protector may be shut down as shown in Fig. 6 so that rats, mice and sparrows cannot get at the feed. When the chicks have grown to such size that they can no longer enter through the openings 24, the detachable housing members 22 may be removed upon loosening the fasteners 20 so that the feeder can still be used.

The provision of a water-tight roof keeps the chicks dry when they are in the feeder while on account of the height of the roof and the openings 24 through which the breeze may pass, the inside of the feeder is prevented from becoming overheated even when placed in the hot sun. When it is desired to clean the feeder, the partition 36 carrying the cone 38 may be readily removed, since this partition is slidably mounted.

I claim:

1. A chick feeder comprising a housing containing a multiplicity of chick entrance openings, a water-tight roof for said housing, a hopper arranged centrally in said housing and passing through said roof, the lower end of said hopper being spaced from the bottom of said housing, and an upstanding flange on said bottom concentric with the lower end of said hopper.

2. A chick feeder comprising a housing which includes removable side members provided with a multiplicity of chick entrance openings, a roof for said housing, a hopper arranged centrally in said housing and passing through said roof, the lower end of said hopper being spaced from the bottom of said housing, and an upstanding flange on said bottom concentric with the lower end of said hopper.

3. A chick feeder comprising a housing which includes vertical posts and removable side members provided with a multiplicity of chick entrance openings, fasteners for securing said side members to said posts, a roof for said housing, a hopper arranged centrally in said housing and passing through said roof, the lower end of said hopper being spaced from the bottom of said housing, and an upstanding flange on said bottom concentric with the lower end of said hopper.

4. A chick feeder comprising a housing containing a multiplicity of chick entrance openings, a roof for said housing, a hopper arranged centrally in said housing and passing through said roof, the lower end of said hopper being spaced from the bottom of said housing, guiding means secured to said hopper, a slide received in said guiding means and adapted to close the space at the lower end of said hopper, and an upstanding flange on said bottom concentric with the lower end of said hopper.

5. A chick feeder comprising a housing containing a multiplicity of chick entrance openings, a roof for said housing, a hopper arranged centrally in said housing and passing through said roof, the lower end of said hopper being spaced from the bottom of said housing, an upstanding flange on said bottom concentric with the lower end of said hopper, a protector extending outwardly around the lower portion of said hopper, and means for adjustably holding said protector so that its lower edge may be placed in contact with the upper edge of said flange or in spaced relation thereto.

In testimony whereof I hereunto affix my signature.

ISAAC JULIAN.